(12) United States Patent
Raman et al.

(10) Patent No.: US 9,112,817 B2
(45) Date of Patent: Aug. 18, 2015

(54) EFFICIENT TRILL FORWARDING

(71) Applicant: BROCADE COMMUNICATIONS SYSTEMS, INC., San Jose, CA (US)

(72) Inventors: Mythilikanth Raman, San Jose, CA (US); Mary Manohar, Santa Clara, CA (US); Phanidhar Koganti, Hyderabad (IN); Suresh Vobbilisetty, San Jose, CA (US); Shunjia Yu, San Jose, CA (US); Pankaj Srivastava, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/273,414

(22) Filed: May 8, 2014

(65) Prior Publication Data

US 2014/0241364 A1 Aug. 28, 2014

Related U.S. Application Data

(63) Continuation of application No. 13/365,993, filed on Feb. 3, 2012, now Pat. No. 8,885,641.

(60) Provisional application No. 61/503,253, filed on Jun. 30, 2011.

(51) Int. Cl.
*H04L 12/741* (2013.01)
*H04L 12/46* (2006.01)
*H04L 12/713* (2013.01)

(52) U.S. Cl.
CPC .......... *H04L 45/745* (2013.01); *H04L 12/4625* (2013.01); *H04L 45/586* (2013.01)

(58) Field of Classification Search
None
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,959,968 A | 9/1999 | Chin |
| 5,973,278 A | 10/1999 | Wehrll, III |
| 5,983,278 A | 11/1999 | Chong |
| 6,041,042 A | 3/2000 | Bussiere |
| 6,085,238 A | 7/2000 | Yuasa |

(Continued)

FOREIGN PATENT DOCUMENTS

| | | |
|---|---|---|
| CN | 102801599 A | 11/2012 |
| EP | 1398920 A2 | 3/2004 |

(Continued)

OTHER PUBLICATIONS

Huang, Nen-Fu et al. "An Effective Spanning Tree Algorithm for a Bridged LAN", Mar. 16, 1992.

(Continued)

*Primary Examiner* — Hong Cho
(74) *Attorney, Agent, or Firm* — Shun Yao; Park, Vaughan, Fleming & Dowler LLP

(57) ABSTRACT

One embodiment of the present invention provides a switch. The switch includes a storage and a lookup mechanism. The storage stores a first table that contains an entry corresponding to a media access control (MAC) address of a device and an identifier of a remote switch associated with the device. The storage also stores a second table that contains an entry indicating a local outgoing interface corresponding to the remote switch. The lookup mechanism identifies the local outgoing interface corresponding to the device based on the first table and the second table.

24 Claims, 7 Drawing Sheets

(56) References Cited

U.S. PATENT DOCUMENTS

| | | | |
|---|---|---|---|
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,542,266 B1 | 4/2003 | Phillips |
| 6,633,761 B1 | 10/2003 | Singhal |
| 6,873,602 B1 | 3/2005 | Ambe |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,465,774 B2 | 6/2013 | Breder et al. |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 2001/0055274 A1 | 12/2001 | Hegge |
| 2002/0019904 A1 | 2/2002 | Katz |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia et al. |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0213582 A1* | 9/2005 | Wakumoto et al. ........ 370/395.3 |
| 2005/0265356 A1 | 12/2005 | Kawarai |
| 2005/0278565 A1 | 12/2005 | Frattura |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0086362 A1 | 4/2007 | Kato |
| 2007/0094464 A1 | 4/2007 | Sharma |
| 2007/0097968 A1 | 5/2007 | Du |
| 2007/0116224 A1 | 5/2007 | Burke |
| 2007/0116422 A1 | 5/2007 | Reynolds |
| 2007/0177589 A1* | 8/2007 | Endo ........................... 370/389 |
| 2007/0177597 A1 | 8/2007 | Ju |
| 2007/0183313 A1 | 8/2007 | Narayanan |
| 2007/0211712 A1 | 9/2007 | Fitch |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |

(56) References Cited

U.S. PATENT DOCUMENTS

| | | |
|---|---|---|
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk et al. |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0042270 A1 | 2/2009 | Dolly et al. |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138752 A1 | 5/2009 | Graham |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1 | 10/2009 | Hares |
| 2009/0245242 A1 | 10/2009 | Carlson |
| 2009/0246137 A1 | 10/2009 | Hadida Ruah et al. |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston et al. |
| 2010/0169467 A1 | 7/2010 | Shukla |
| 2010/0169948 A1 | 7/2010 | Budko |
| 2010/0182920 A1 | 7/2010 | Matsuoka |
| 2010/0220724 A1 | 9/2010 | Rabie |
| 2010/0226381 A1 | 9/2010 | Mehta |
| 2010/0238927 A1* | 9/2010 | Jain et al. ............. 370/390 |
| 2010/0246388 A1* | 9/2010 | Gupta et al. ............. 370/225 |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284414 A1 | 11/2010 | Agarwal et al. |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035489 A1 | 2/2011 | McDaniel et al. |
| 2011/0035498 A1 | 2/2011 | Shah |
| 2011/0044339 A1 | 2/2011 | Kotalwar |
| 2011/0055274 A1 | 3/2011 | Scales |
| 2011/0064086 A1 | 3/2011 | Xiong |
| 2011/0064089 A1 | 3/2011 | Hidaka et al. |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu et al. |
| 2011/0299533 A1 | 12/2011 | Yu et al. |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0230800 A1 | 9/2012 | Kimura |
| 2012/0243359 A1 | 9/2012 | Katoch |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327937 A1 | 12/2012 | Melman et al. |
| 2013/0028072 A1 | 1/2013 | Addanki |
| 2013/0034015 A1 | 2/2013 | Jaiswal |
| 2013/0067466 A1 | 3/2013 | Combs |
| 2013/0127848 A1 | 5/2013 | Joshi |
| 2013/0194914 A1 | 8/2013 | Agarwal |
| 2013/0250951 A1 | 9/2013 | Koganti |
| 2013/0259037 A1 | 10/2013 | Natarajan |
| 2014/0105034 A1 | 4/2014 | Sun |

(56) References Cited

U.S. PATENT DOCUMENTS

FOREIGN PATENT DOCUMENTS

| EP | 2001167 A1 | 8/2007 |
| EP | 1916807 A2 | 10/2007 |
| WO | 2009042919 | 4/2009 |
| WO | 2010111142 A1 | 9/2010 |

OTHER PUBLICATIONS

Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release Fgs 05.0.00a, 2008.
FastIron and TurbuIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(Sep. 1994), No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 13, 2013, U.S. Appl. No. 13/092,701, filed Apr. 22, 2011.
Office action dated Feb. 5, 2013, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.

(56) References Cited

OTHER PUBLICATIONS

Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,724, filed Apr. 22, 2011.
Office Action dated Mar. 14, 2014, U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Brocade, 'Fastlron and Turbolron 24x Configuration Guide', Feb. 16, 2010.
Brocade Brocade Unveils The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
'RBridges: Base Protocol Specification', IETF Draft, Perlman et al., Jun. 26, 2009.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.

(56) References Cited

OTHER PUBLICATIONS

Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private Lan Service (VPLS) Using BGP for Auto-Discovery and Signaling' Jan. 2007.

\* cited by examiner

| LAYER-2 FORWARDING TABLE 200 | | |
| --- | --- | --- |
| LOOKUP KEY 202 | | RESULT 204 |
| MAC ADDRESS 212 | VLAN ID 214 | RBRIDGE ID 220 |

| RBRIDGE ROUTE TABLE 230 | | |
| --- | --- | --- |
| LOOKUP KEY 232 | RESULT 234 | |
| RBRIDGE ID 220 | NH RBRIDGE MAC 242 | OUTGOING INTERFACE 244 |

| LAYER-2 FORWARDING TABLE 400 ||  |
|---|---|---|
| LOOKUP KEY 402 || RESULT 404 |
| MAC ADDRESS 412 | VLAN ID 414 | RBRIDGE ID 440 OR VLAG ID 425 |

FIG. 4A

| VLAG MAPPING TABLE 430 |  |
|---|---|
| LOOKUP KEY 432 | RESULT 434 |
| VLAG ID 425 | LIST OF RBRIDGE ID 445 |

FIG. 4B

| RBRIDGE ROUTE TABLE 450 |  |  |
|---|---|---|
| LOOKUP KEY 452 | RESULT 454 ||
| RBRIDGE ID 440 | NH RBRIDGE MAC 462 | OUTGOING INTERFACE 464 |

FIG. 4C

EFFICIENT TRILL FORWARDING

RELATED APPLICATIONS

This application is a continuation application of application Ser. No. 13/365,993, entitled "Efficient TRILL Forwarding," by inventors Mythilikanth Raman, Mary Manohar, Phanidhar Koganti, Suresh Vobbilisetty, Shunjia Yu, and Pankaj Srivastava, filed 3 Feb. 2012, which claims the benefit of U.S. Provisional Application No. 61/503,253, titled "Efficient TRILL Forwarding," by inventors Mythilikanth Raman, Mary Manohar, Phanidhar Koganti, Suresh Vobbilisetty, Shunjia Yu, and Pankaj Srivastava, filed 30 Jun. 2011, the disclosures of which are incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

1. Field

The present disclosure relates to network management. More specifically, the present disclosure relates to a method and system for constructing scalable forwarding tables that reduce the number of modifications to the entries in the tables during an update.

2. Related Art

The growth of the Internet has brought with it an increasing demand for bandwidth. As a result, equipment vendors race to build larger and faster switches, each capable of supporting a large number of end devices, to move more traffic efficiently. The forwarding table in such a switch grows substantial with a large number of coupled end devices. Furthermore, an update to the forwarding table in the switch may lead to a large number of changes to the entries in the table. More importantly, because an overly large forwarding table often does not scale, simply increasing the size of a forwarding table in a switch may become unviable due to the increased complexity and operations.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when scalable and easy-to-update forwarding tables are desired.

SUMMARY

One embodiment of the present invention provides a switch. The switch includes a storage and a lookup mechanism. The storage stores a first table that contains an entry corresponding to a media access control (MAC) address of a device and an identifier of a remote switch associated with the device. The storage also stores a second table that contains an entry indicating a local outgoing interface corresponding to the remote switch. The lookup mechanism identifies the local outgoing interface corresponding to the device based on the first table and the second table.

In a variation on this embodiment, the entry in the first table contains a virtual local area network (VLAN) tag associated with the device.

In a variation on this embodiment, the identifier to the remote switch is a Transparent Interconnection of Lots of Links (TRILL) routing bridge (RBridge) identifier.

In a variation on this embodiment, the remote switch is a virtual switch comprising a number of physical switches and the storage also stores a third table that contains one or more entries which map the identifier of the virtual switch to one or more identifiers of the physical switches.

In a further variation on this embodiment, the remote virtual switch is a virtual RBridge and the identifier of the remote virtual switch is a virtual RBridge identifier.

In a variation on this embodiment, the switch also includes an updating mechanism that updates the entry in the second table in response to a route change to the remote switch.

In a variation on this embodiment, the switch also includes a logical switch management mechanism that maintains a membership in a logical switch, wherein the logical switch is configured to accommodate a plurality of switches and operates as a single logical switch.

BRIEF DESCRIPTION OF THE FIGURES

FIG. 4A illustrates an exemplary layer-2 forwarding table that stores a mapping between the MAC address of a device, and an RBridge identifier or a virtual link aggregation identifier, in accordance with an embodiment of the present invention.

FIG. 4B illustrates an exemplary virtual link aggregation mapping table that stores a mapping between a virtual link aggregation identifier and a list of corresponding RBridge identifiers, in accordance with an embodiment of the present invention.

FIG. 4C illustrates an exemplary RBridge route table that stores a mapping between an RBridge identifier and a corresponding local outgoing interface, in accordance with an embodiment of the present invention.

DETAILED DESCRIPTION

Figures 1, 2A, 2B:
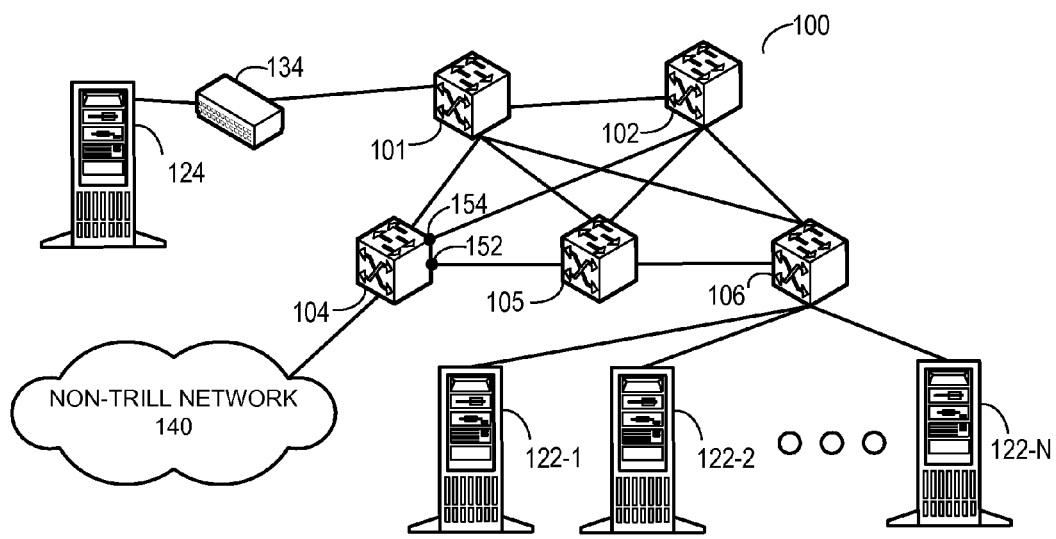
FIG. 1 illustrates an exemplary network that includes a large number of end devices coupled to an RBridge, in accordance with an embodiment of the present invention.
FIG. 2A illustrates an exemplary layer-2 forwarding table that stores a mapping between the MAC address of a device and an RBridge identifier to a remote RBridge associated with the device, in accordance with an embodiment of the present invention.
FIG. 2B illustrates an exemplary RBridge route table that stores a mapping between an RBridge identifier and a corresponding local outgoing interface, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of constructing a scalable and flexible way of storing layer-2 forwarding information in an RBridge in a TRILL network is solved by storing the forwarding information in hierarchical tables. The hierarchical tables allow forwarding information to be divided into coherent parts, with each such part stored in a separate table. As a result, in response to a change in the network, an update only to the corresponding table may be sufficient while the other tables may remain unchanged. On the other hand, in a conventional TRILL network, such layer-2 forwarding information is usually saved in a large table. A single change in the network may require several modifications to the table. For example, a single change in some networks may result in several thousand such updates.

In some embodiments of the present invention, whenever an RBridge learns about an end device associated with the TRILL network, the RBridge stores the MAC address of the end device and the egress RBridge identifier associated with the end device in a first table, and the egress RBridge identifier and a corresponding local outgoing interface in a second table. The outgoing interface indicates that all traffic destined to the egress RBridge should be sent via the interface. Whenever a packet is sent to the end device, the RBridge maps the egress RBridge identifier associated with the device in the first table to the outgoing interface corresponding to the egress RBridge in the second table, and transmits the packet via the interface. In some embodiments, a single RBridge identifier can be associated with several thousand end devices. However, only one outgoing interface is typically associated with an RBridge. As a result, if there is a change in the network and the outgoing interface associated with the RBridge should be changed, only one modification to the second table is sufficient. For example, a link failure in the network may cause the RBridge to route traffic on a different path to the egress RBridge. Only one modification in the second table can reflect the new path to the egress RBridge.

In some embodiments, the RBridge can learn the MAC address from a virtual link aggregation. Under such a scenario, the RBridge stores the MAC address of the end device and a virtual link aggregation identifier associated with the end device in a first table, the virtual link aggregation identifier and identifiers to the RBridges participating in the link aggregation in a second table, and each RBridge identifier and a corresponding local outgoing interface in a third table. Whenever a packet is sent to the end device, the RBridge maps the virtual link aggregation identifier associated with the end device in the first table to the participating RBridge identifiers in the second table. The RBridge then identifies the primary RBridge in the link aggregation, maps the corresponding RBridge identifier to the outgoing interface in the third table, and transmits the packet via the interface.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to the application among RBridges. Other types of switches, routers, and forwarders can also be used.

In this disclosure, the term "edge port" refers to a port on an RBridge which sends/receives data frames in native Ethernet format. The term "TRILL port" refers to a port which sends/receives data frames encapsulated with a TRILL header and outer MAC header.

The term "end device" refers to a network device that is typically not TRILL-capable. "End device" is a relative term with respect to the TRILL network. However, "end device" does not necessarily mean that the network device is an end host. An end device can be a host, a conventional layer-2 switch, or any other type of network device. Additionally, an end device can be coupled to other switches or hosts further away from the TRILL network. In other words, an end device can be an aggregation point for a number of network devices to enter the TRILL network.

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID" or "RBridge nickname" or any other format that can identify an RBridge.

The term "dual-homed end device" refers to an end device that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end device" does not limit the number of physical RBridges sharing the aggregate link to two. In various embodiments, other numbers of physical RBridges can share the same aggregate link. Where "dual-homed end device" is used in the present disclosure, the term "multi-homed end device" can also be used.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

In this disclosure, the term "forwarding information" is used in a generic sense and refers to any information that is associated with a forwarding decision in a layer-2 or a TRILL network. The terms "interface" and "port" are used interchangeably in this disclosure.

Network Architecture

FIG. 1 illustrates an exemplary network that includes a large number of end devices coupled to an RBridge, in accordance with an embodiment of the present invention. As illustrated in FIG. 1, a TRILL network 100 includes RBridges 101, 102, 104, 105, and 106. A large number of end devices, from 122-1 to 122-N, are coupled to RBridge 106. RBridge 101 is coupled to end device 124 and RBridge 104 is coupled to a non-TRILL network 140. RBridges in network 100 use edge ports to communicate to end devices and TRILL ports to communicate to other RBridges. For example, RBridge 106 is coupled to end devices 122-1 to 122-N via edge ports and to RBridges 101, 102, and 105 via TRILL ports. An end device coupled to an edge port may be a host machine or an aggregation node. For example, end devices 122-1 to 122-N are host machines directly coupled to network 100, and end device 124 is coupled to network 100 via an aggregation node, a layer-2 bridge 134.

During operation, end device 122-1 sends a packet to network 140 via ingress RBridge 106 and egress RBridge 104. During this process, RBridge 104 learns the MAC address of end device 122-1, an identifier to RBridge 106, and a local interface 152 through which the packet was received. RBridge 104 stores the MAC address and the corresponding RBridge identifier to a layer-2 forwarding table, and the RBridge identifier and the corresponding interface in an RBridge route table. The entry in the forwarding table indicates that end device 122-1 can be reached via RBridge 106, and the entry in the route table indicates that all TRILL packets destined to RBridge 106 should be sent via interface 152. When a packet destined to end device 122-1 arrives at RBridge 104 from network 140, RBridge 104 maps the RBridge identifier from the forwarding table with the local interface in the route table. As a result, RBridge 104 determines that the packet to end device 122-1 should be sent via interface 152. Note that the intermediate RBridge 105 also learns the MAC address of end device 122-1 and saves the corresponding RBridge identifier and local interface in its local forwarding and route tables, respectively.

Similarly, during operation, when end devices 122-2 to 122-N send packets to network 140, RBridge 104 stores the MAC addresses of end devices 122-2 to 122-N and the identifier to RBridge 106 to the forwarding table. However, as the interface information regarding RBridge 106 is already saved in the RBridge route table, RBridge 104 does not need to reenter the data. In some embodiments, TRILL network 100 may support multipath routing. Under such a scenario, packets from RBridge 106 can be received at RBridge 104 via a separate interface 154. RBridge 104 then stores the RBridge identifier and the corresponding interface information in the route table. All subsequent packets from RBridge 104 can be sent to RBridge 106 over multiple paths via interfaces 152 and 154.

During operation that does not involve storing forwarding information in hierarchical tables, an RBridge in the TRILL network may store all forwarding information in a single table. For example, in FIG. 1, when end device 122-1 sends a packet to network 140, egress RBridge 104 learns the MAC address of the device, the identifier to ingress RBridge 106, and the corresponding interface 152 in a single forwarding information table. Similarly, when end devices 122-2 to 122-N send packets to network 140, RBridge 104 learns the respective forwarding information and stores them in the forwarding information table. Under the scenario where network 100 supports multipath routing, when RBridge 104 learns another route to RBridge 106 via interface 154, RBridge 104 needs to add the new interface information to all entries corresponding to all end devices coupled to RBridge 106. Furthermore, if the path to RBridge 106 through interface 152 becomes unavailable (e.g., during a link failure), RBridge 104 needs to modify all entries corresponding to all end devices coupled to RBridge 106 as well. As a result, forwarding information management becomes inefficient and each update operation may lead to a large number of changes in the forwarding information table.

In embodiments of the present invention, as illustrated in FIG. 1, adding an additional interface for supporting multiple paths to RBridge 106 requires RBridge 104 to modify a single entry in the RBridge route table. For all packets destined to a MAC address associated with the RBridge 106 identifier in the forwarding table, RBridge 104 obtains the corresponding interface information (e.g., interfaces 152 and 154) from the route table and may choose to use either of or both the interfaces. Similarly, if the path to RBridge 106 through interface 152 becomes unavailable due to a failure, RBridge 104 modifies just one entry corresponding to interface 152 and RBridge 106 in the route table. Note that though each link in FIG. 1 has an interface at each end-point of the link, in FIG. 1, only interfaces 152 and 154 are shown.

In some embodiments, TRILL network 100 may be a virtual cluster switch (VCS). In a VCS, any number of RBridges in any arbitrary topology may logically operate as a single switch. Any new RBridge may join or leave the VCS in "plug-and-play" mode without any manual configuration.

Note that TRILL is only used as a transport between the switches within network 100. This is because TRILL can readily accommodate native Ethernet frames. Also, the TRILL standards provide a ready-to-use forwarding mechanism that can be used in any routed network with arbitrary topology. Embodiments of the present invention should not be limited to using only TRILL as the transport. Other protocols (such as Internet Protocol (IP) or Multi-Protocol Label Switching (MPLS)), either public or proprietary, can also be used for the transport.

Forwarding Information Management

In some embodiments, a respective RBridge maintains two hierarchical tables to store forwarding information learned from a TRILL network. The first table is a layer-2 forwarding table that stores lookup keys for a respective end device learned at the RBridge and the corresponding ingress RBridge identifier. The second table is an RBridge route table that stores local interface information associated with a respective RBridge in the network. Mapping the RBridge identifiers in these two hierarchical tables provides interface information for a respective end device.

FIG. 2A illustrates an exemplary layer-2 forwarding table that stores a mapping between the MAC address of a device and an RBridge identifier to a remote RBridge associated with the device, in accordance with an embodiment of the present invention. Layer-2 forwarding table 200 in FIG. 2A stores lookup key 202 associated with each end device and a corresponding result 204. Lookup key 202 includes MAC address 212 of the end device. An RBridge uses lookup key 202 to obtain result 204 that provides necessary forwarding information associated with the device. Result 204 includes RBridge identifier 220 corresponding to an RBridge to which the device is coupled. Essentially, looking up MAC address 212 in table 200 provides the corresponding RBridge identifier 220. In some embodiments, lookup key 202 also includes an identifier 214 to a VLAN to which the end device belongs. Under such a scenario, both MAC address 212 and VLAN identifier 214 are used to determine RBridge identifier 220. For example, in some embodiments, a single end device may belong to different VLANs and be associated with different RBridges accordingly. Hence, with a different VLAN identifier in the lookup key, the same MAC address may provide a different RBridge identifier. On the other hand, a VLAN can be associated with multiple RBridges and end devices coupled to different RBridges may belong to the VLAN. Hence, with different MAC addresses in the lookup key, the same VLAN identifier may provide different RBridge identifiers.

FIG. 2B illustrates an exemplary RBridge route table that stores a mapping between an RBridge identifier and a corresponding local outgoing interface, in accordance with an embodiment of the present invention. RBridge route table 230 in FIG. 2B includes a lookup key 232 and a corresponding result 234. Lookup key 232 includes the RBridge identifier 220. Note that the same RBridge identifier in tables 200 and 230 corresponds to the same RBridge. Result 234 includes an outgoing interface 244 through which the RBridge associated with identifier 220 can be reached and a next-hop RBridge MAC address 242. Essentially, looking up RBridge identifier 220 in table 230 provides the corresponding outgoing interface 240 and next-hop MAC address 242. MAC address 242 is used as the destination address of the outer Ethernet header of a TRILL frame sent via interface 244.

Virtual Link Aggregation

Figure 3:
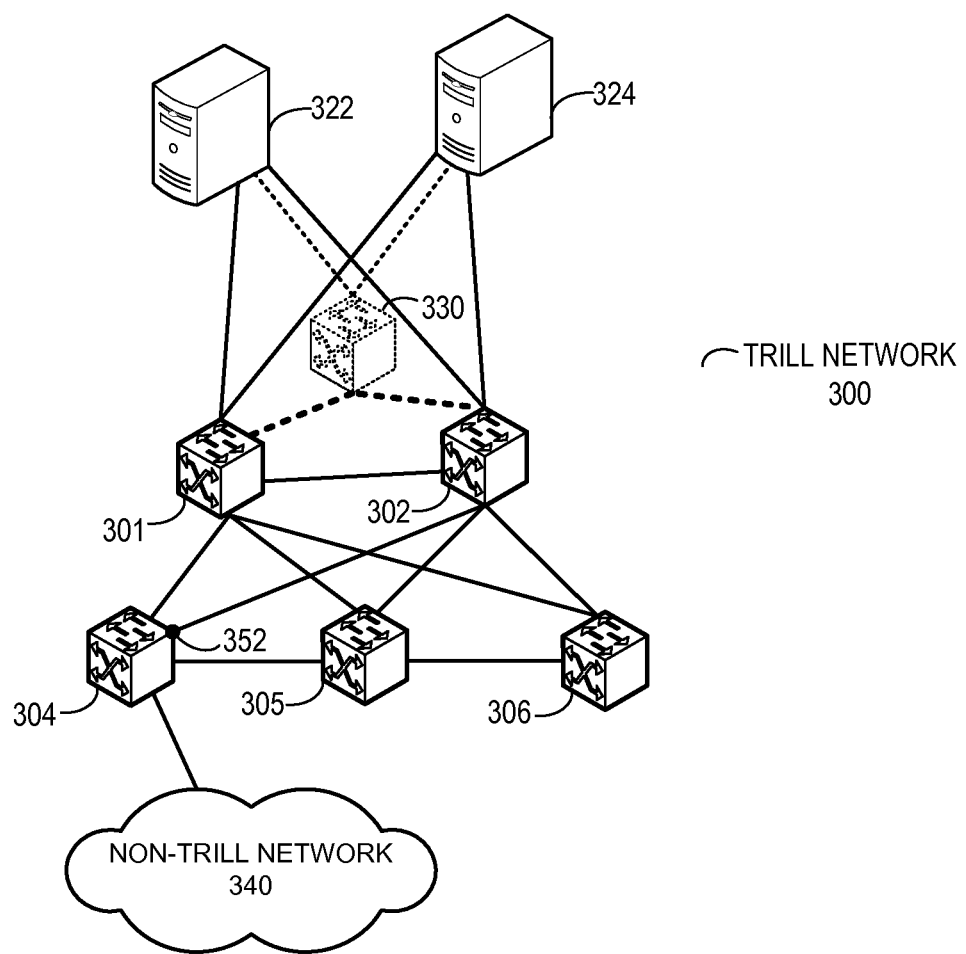
FIG. 3 illustrates an exemplary network where a virtual RBridge identifier is assigned to two physical TRILL RBridges which are coupled to end devices via virtually aggregated links, in accordance with an embodiment of the present invention.

FIG. 3 illustrates an exemplary network where a virtual RBridge identifier is assigned to two physical TRILL RBridges which are coupled to end devices via virtually aggregated links, in accordance with an embodiment of the present invention. As illustrated in FIG. 3, a TRILL network 300 includes RBridges 301, 302, 304, 305, and 306. RBridge 304 is coupled to a non-TRILL network 340. End devices 322 and 324 are both dual-homed and coupled to RBridges 301 and 302. The goal is to allow a dual-homed end station to use both physical links to two separate TRILL RBridges as a single, logical aggregate link, with the same media access control (MAC) address. Such a configuration would achieve true redundancy and facilitate fast protection switching.

RBridges 301 and 302 are configured to operate in a special "trunked" mode for end devices 322 and 324. End devices 322 and 324 view RBridges 301 and 302 as a common virtual RBridge 330, with a corresponding virtual RBridge identifier. Dual-homed end devices 322 and 324 are considered to be logically coupled to virtual RBridge 330 via logical links represented by dotted lines. Virtual RBridge 330 is considered to be logically coupled to both RBridges 301 and 302, optionally with zero-cost links (also represented by dotted lines). Among the links in a link trunk, one link is selected to be a primary link. For example, the primary link for end device 322 can be the link to RBridge 301. RBridges which participate in link aggregation and form a virtual RBridge are referred to as "partner RBridges." Operation of virtual RBridges for multi-homed end devices is specified in U.S. patent application Ser. No. 12/725,249, entitled "Redundant Host Connection in a Routed Network," by inventors Somesh Gupta, Anoop Ghawani, Phanidhar Koganti, and Shunjia Yu, filed 16 Mar. 2010, the disclosure of which is incorporated herein in its entirety.

When end device 322 sends a packet to network 340 via virtual RBridge 330, egress RBridge 304 receives the packet and recognizes that the packet is from a dual-homed end device. Hence, RBridge 304 stores the MAC address of end device 322 and a corresponding virtual link aggregation identifier in a layer-2 forwarding table. In some embodiments, the virtual link aggregation identifier is a virtual RBridge identifier associated with virtual RBridge 330. RBridge 304 also stores the virtual link aggregation identifier and identifiers to RBridges 301 and 302 in a virtual link aggregation mapping table. In other words, the mapping table contains the list of partner RBridges associated with a virtual RBridge. RBridge 304 associates the local interface from which the frame was received with the ingress RBridge and stores identifiers to the ingress RBridge and the associated interface in an RBridge route table, as described in conjunction with FIG. 2B. For example, when RBridge 304 learns that RBridge 301 can be reached via interface 352, the information is saved in the route table.

FIG. 4A illustrates an exemplary layer-2 forwarding table that stores a mapping between the MAC address of a device, and an RBridge identifier or a virtual link aggregation identifier, in accordance with an embodiment of the present invention. Layer-2 forwarding table 400 in FIG. 4A stores lookup key 402 associated with a respective end device and a corresponding result 404. Lookup key 402 includes MAC address 412 of the end device. If the end device is dual-homed, result 404 includes virtual link aggregation identifier 425 associated with the end device. Otherwise, result 404 includes an RBridge identifier 440 corresponding to an RBridge to which the end device is coupled. In some embodiments, lookup key 402 also includes an identifier 414 to a VLAN to which the end device belongs.

FIG. 4B illustrates an exemplary virtual link aggregation mapping table that stores a mapping between a virtual link aggregation identifier and a list of corresponding RBridge identifiers, in accordance with an embodiment of the present invention. Virtual link aggregation mapping table 430 in FIG. 4B stores lookup key 432 and a corresponding result 434. Lookup key 432 includes a virtual link aggregation identifier 425 and result 434 includes a list of physical RBridges 445 participating in the link aggregation associated with identifier 425. An RBridge maps virtual link aggregation identifier 425 in tables 400 and 430, and recognizes the physical RBridges coupled to a dual-homed end device. This table allows an ingress RBridge to send data to a dual-homed end device over multiple paths. For example, in FIG. 3, RBridge 304 stores an identifier to virtual RBridge 330 and identifiers to associated physical RBridges 301 and 302 in a virtual link aggregation mapping table. RBridge 304 thus can send packets to dual-homed end device 322 over multiple paths via both RBridges 301 and 302 by checking their association with virtual RBridge 330 from the virtual link aggregation mapping table.

FIG. 4C illustrates an exemplary RBridge route table that stores a mapping between an RBridge identifier and a corresponding local outgoing interface, in accordance with an embodiment of the present invention. RBridge route table 450 in FIG. 4C includes a lookup key 452 and a corresponding result 454. Lookup key 452 includes an RBridge identifier 440. In some embodiments, RBridge identifier 440 can be included in list 445, if the RBridge associated with RBridge identifier 440 participates in the virtual link aggregation associated with virtual link aggregation identifier 425. Result 454 includes an outgoing interface 464 through which the RBridge associated with identifier 440 can be reached and a next-hop RBridge MAC address 462.

Frame Processing

Figure 5A:
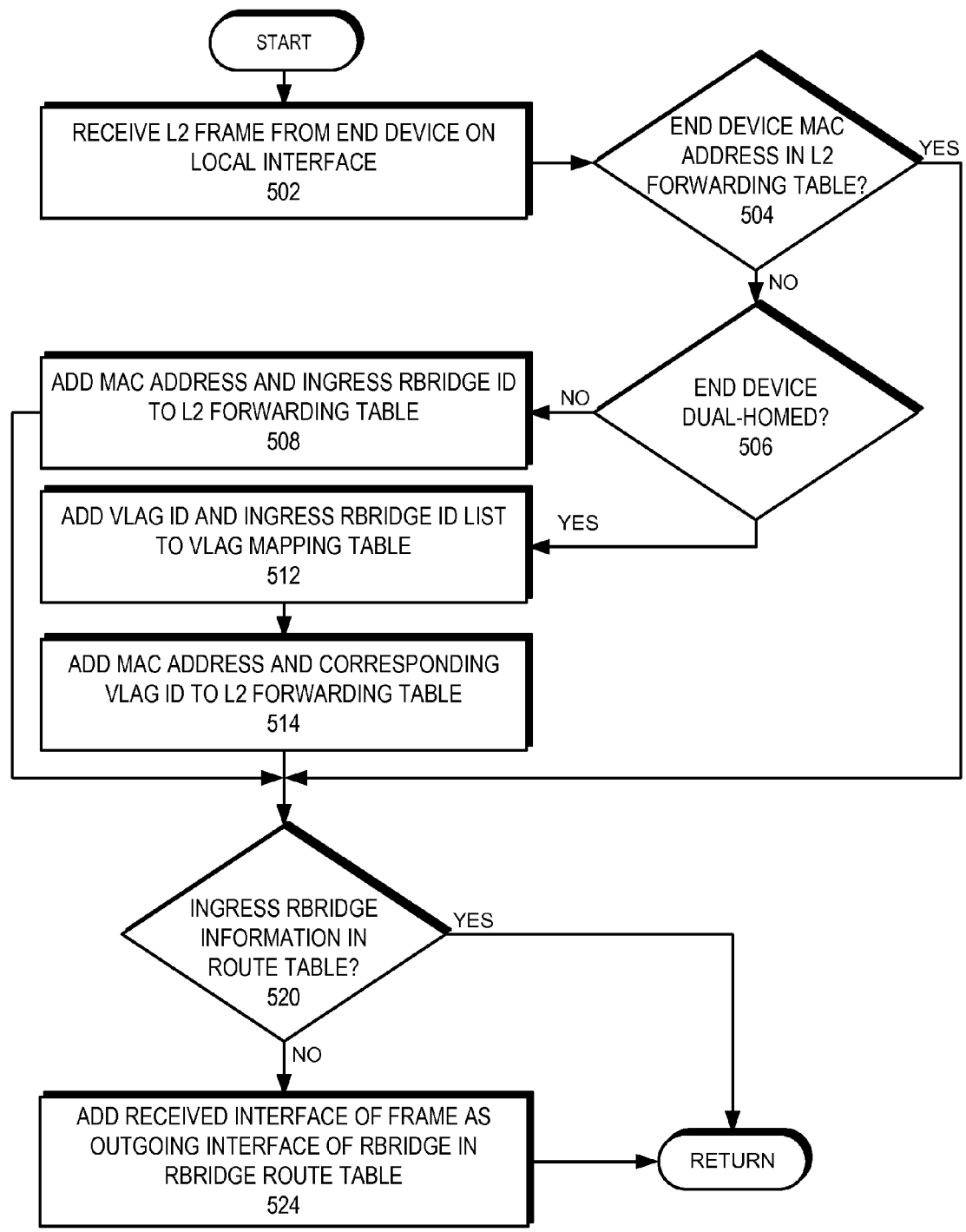
FIG. 5A presents a flowchart illustrating the process of an RBridge updating the forwarding information in hierarchical tables, in accordance with an embodiment of the present invention.

In some embodiments, an RBridge in a TRILL network learns MAC addresses of end devices coupled to the network from the frames it processes, and updates forwarding and route tables accordingly. In some embodiments, an RBridge can be a member switch in a VCS and learn MAC addresses from messages sent by other member switches in the VCS. FIG. 5A presents a flowchart illustrating the process of an RBridge updating the forwarding information in hierarchical tables, in accordance with an embodiment of the present invention. The RBridge first receives a frame from a local interface (operation 502). The local interface can be either an edge port or a TRILL port. The RBridge then checks whether the MAC address of the end device is in the layer-2 forwarding table (operation 504). If not, then the RBridge checks whether the end device is dual-homed (operation 506). If the device is not dual-homed, then the MAC address of the end device and the ingress RBridge identifier are added to the layer-2 forwarding table (operation 508). If the device is dual-homed, then the RBridge adds the virtual link aggregation identifier and all physical RBridges associated with the aggregation to the virtual link aggregation mapping table (operation 512) and adds the MAC address of the end device and the virtual link aggregation identifier to the layer-2 forwarding table (operation 514). In some embodiments, a respective entry is added to a virtual link aggregation mapping table (operation 512) when a respective virtual link aggregation is created.

If the MAC address is already in the forwarding table (operation 504), then the device has already learned about the end device and the associated RBridge. Hence, after finding the MAC address in the forwarding table (operation 504) or updating the forwarding table with the MAC address (operations 508 or operation 514), the RBridge checks whether the ingress RBridge information is already in the route table (operation 520). If the ingress RBridge information is not in the route table, the local interface from which the frame is received is added to the RBridge route table as the outgoing interface associated with the ingress RBridge identifier (operation 524). If the ingress RBridge information is in the route table and the frame is received from an interface already associated with the ingress RBridge, then the forwarding information associated with the ingress RBridge is already learned and not update to the hierarchical tables is needed.

Figure 5B:
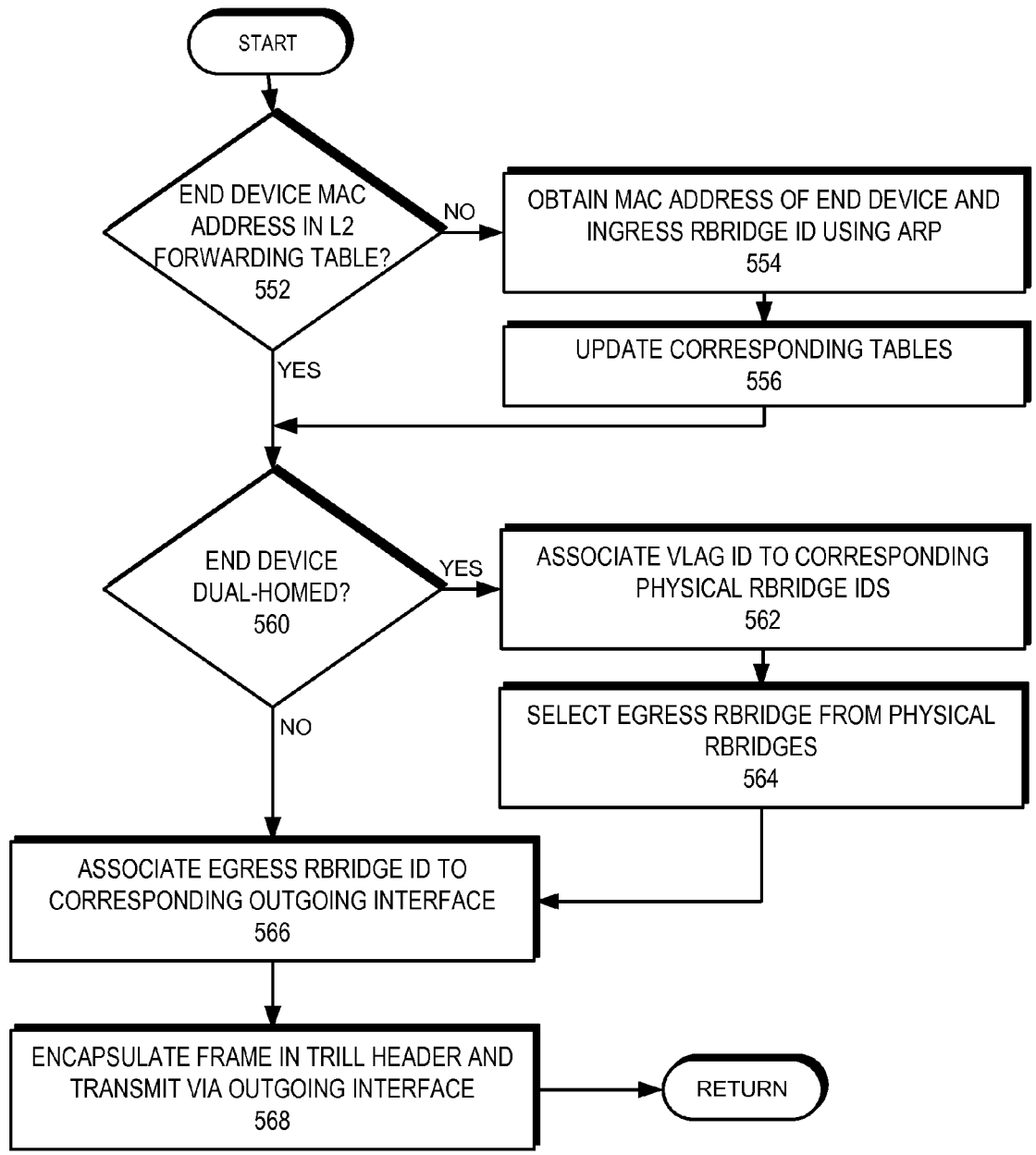
FIG. 5B presents a flowchart illustrating the process of an RBridge using the forwarding information in hierarchical tables to make a forwarding decision, in accordance with an embodiment of the present invention.

FIG. 5B presents a flowchart illustrating the process of an RBridge using the forwarding information in hierarchical tables to make a forwarding decision, in accordance with an embodiment of the present invention. The RBridge first checks whether the MAC address of a destination end device is already known (operation 552). If not, then the RBridge obtains the MAC address of the end device and the ingress RBridge identifier using ARP (operation 554) and updates the forwarding table, the mapping table, and the route table, as needed, using the obtained information (operation 556), as described in conjunction with FIG. 5A. If the end device MAC address is already known (operation 552) or the tables are updated (operation 556), the RBridge then checks whether the end device is multi-homed (operation 560). If so, then the RBridge maps the virtual link aggregation identifier in the forwarding table to the corresponding virtual link aggregation identifier in the mapping table, and obtains the list of associated physical RBridges (operation 562). The RBridge then selects the egress RBridge from the list of physical RBridges (operation 564). In some embodiments, the RBridge can forward packets to the multi-homed destination end device over multiple paths by sending the packet via multiple physical RBridges associated with the virtual link aggregation.

Once the egress RBridge is identified, the RBridge maps the egress RBridge identifier in the mapping table to the corresponding RBridge identifier in the route table, and obtains the outgoing interface associated with the egress RBridge (operation 566). If the end device is not multi-homed (operation 560), the RBridge maps the egress RBridge identifier associated with destination the end device in the forwarding table with the corresponding RBridge identifier the route table, and obtains the outgoing interface associated with the egress RBridge (operation 566). After obtaining the outgoing interface, the RBridge encapsulates the frame in a TRILL header and transmits the frame via the outgoing interface (operation 568).

Failure Handling

Figure 6:
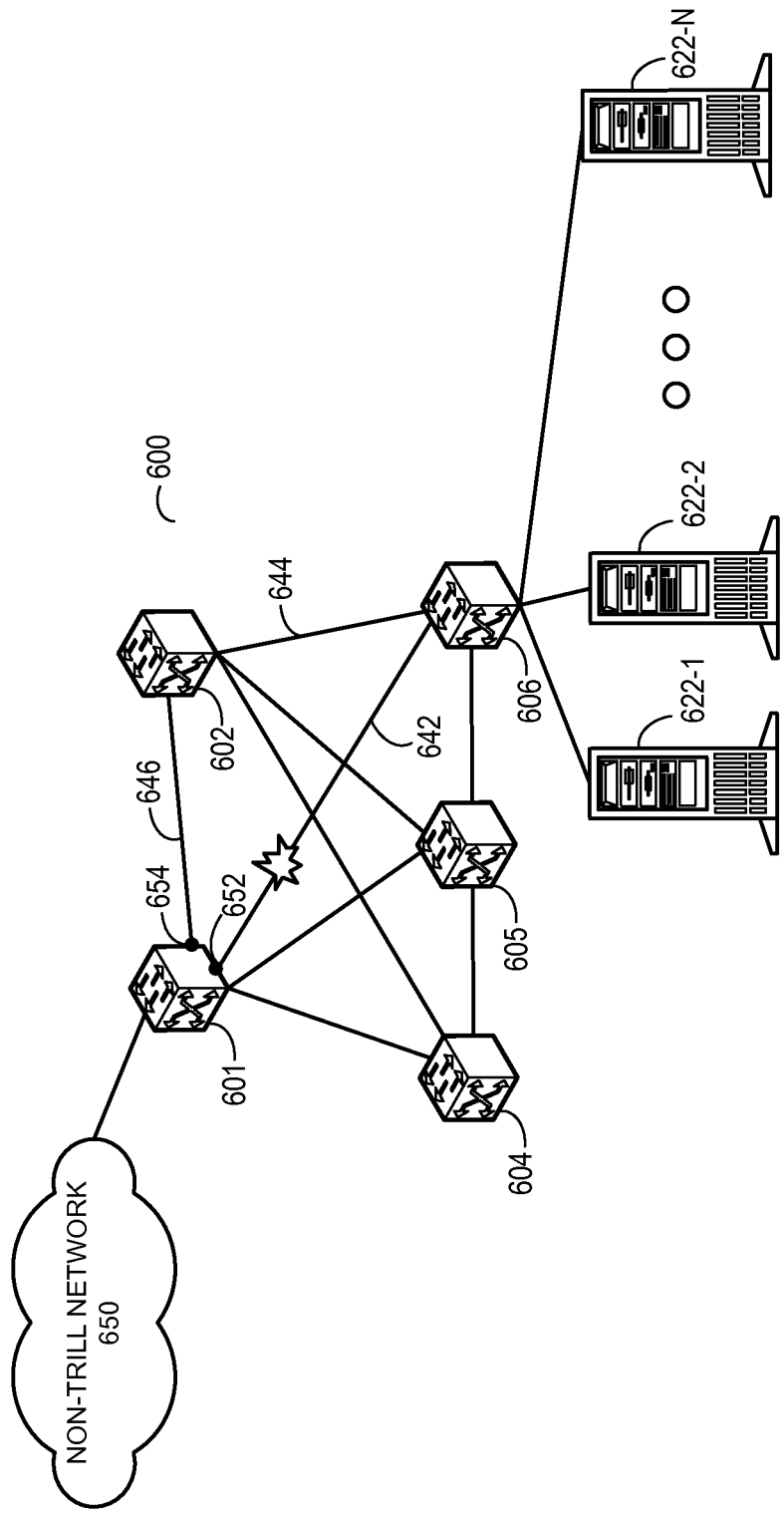
FIG. 6 illustrates a scenario where one of the RBridges associated with an end device experiences a link failure, in accordance with an embodiment of the present invention.

FIG. 6 illustrates a scenario where one of the RBridges associated with an end device experiences a link failure, in accordance with an embodiment of the present invention. In this example, a TRILL network 600 includes RBridges 601, 602, 604, 605, and 606. A large number of end devices, denoted by end devices 622-1 to 622-N, are coupled to RBridge 606. RBridge 601 is coupled to a non-TRILL network 650. During operation, end devices 622-1 to 622-N send packets to network 650 through RBridge 601 via link 642 and interface 652. As a result, RBridge 601 stores MAC addresses of these end devices and an identifier to RBridge 606 in a layer-2 forwarding table, and stores interface 652 and an identifier to RBridge 606 in an RBridge route table.

Suppose that link 642 fails. As a result, interface 652 cannot send packets to RBridge 606 any longer. However, another path from RBridge 606 to RBridge 601 can be established via links 644 and 646. Under such a scenario, interface 654 to link 646 becomes the outgoing interface for all packets destined to RBridge 606. RBridge 601 then updates only one entry corresponding to RBridge 606 in the RBridge route table and replace interface 652 with interface 654. All entries for end devices 622-1 to 622-N in the forwarding table remain unchanged.

On the other hand, if all forwarding information is stored in a single table, each entry for an end device contains both associated RBridge information and the outgoing interface in the table. For example, for end device 622-1, RBridge 601 stores RBridge 606 as the associated RBridge and interface 652 as the outgoing interface in a single entry in the table. Similar entries are saved for end devices 622-2 to 622-N. As a result, when the outgoing interface for RBridge 606 is changed from interface 652 to interface 654, all forwarding entries corresponding to RBridge 606, such as entries for end devices 622-1 to 622-N, are changed. Note that though each link in FIG. 6 has an interface at each end-point of the link, in FIG. 6, only interfaces 652 and 654 are shown.

Exemplary Switch System

Figure 7:
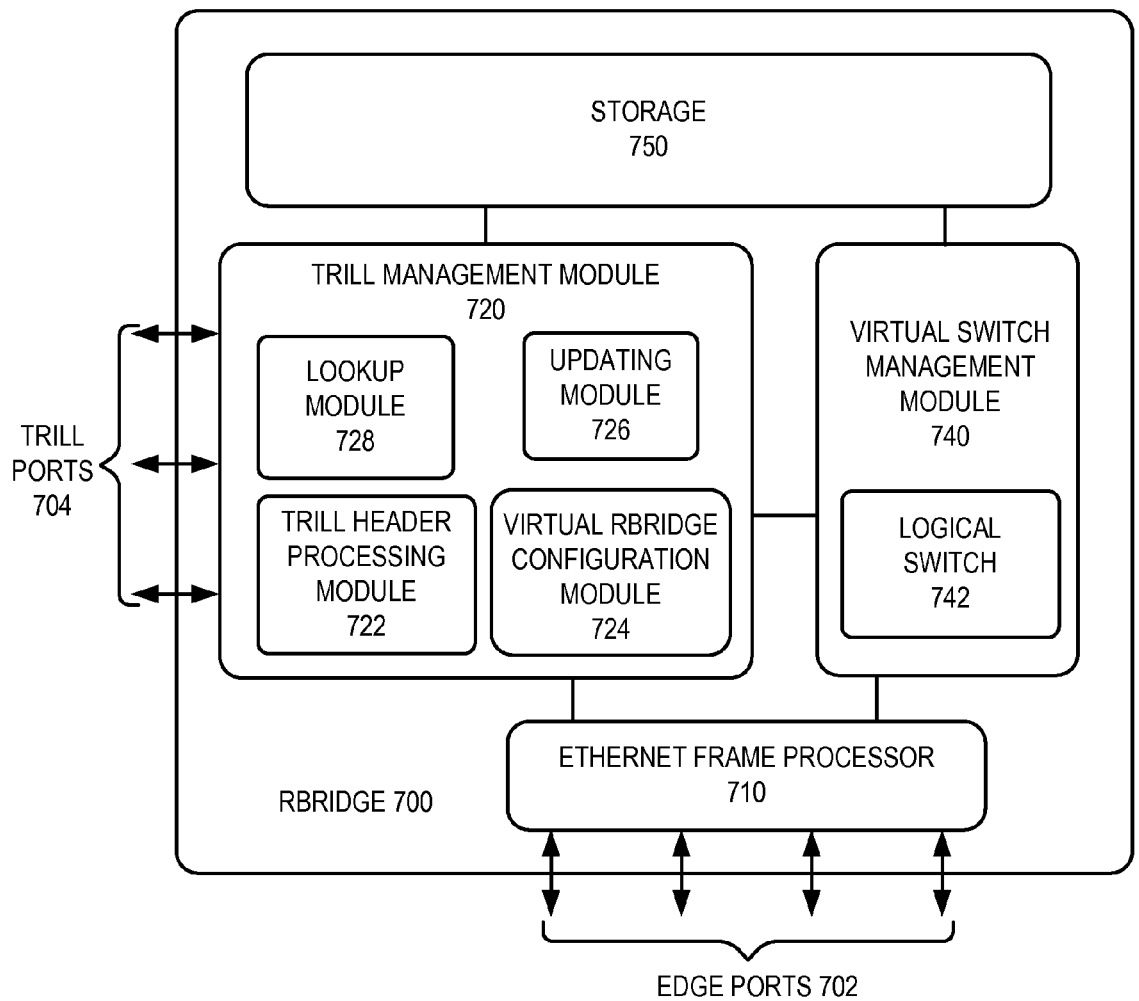
FIG. 7 illustrates an exemplary architecture of a switch with hierarchical forwarding tables, in accordance with an embodiment of the present invention.

FIG. 7 illustrates an exemplary architecture of a switch with hierarchical forwarding tables, in accordance with an embodiment of the present invention. In this example, an RBridge 700 includes a number of TRILL ports 704, a TRILL management module 720, an Ethernet frame processor 710, and a storage 750. TRILL management module 720 further includes a TRILL header processing module 722, a lookup module 728, and an updating module 726. TRILL ports 704 include inter-switch communication channels for communication with one or more RBridges. An inter-switch communication channel can be implemented via a regular communication port and based on any open or proprietary format. Furthermore, the inter-switch communication between RBridges is not required to be direct port-to-port communication.

During operation, TRILL ports 704 receive TRILL frames from (and transmit frames to) other RBridges. TRILL header processing module 722 processes TRILL header information of the received frames and updating module 726 updates forwarding information stored in storage 750 based on their TRILL headers, as described in conjunction with FIG. 5A. To forward a packet, lookup module 728 looks up forwarding information in storage 750, as described in conjunction with FIG. 5B.

In some embodiments, RBridge 700 may participate in a virtual link aggregation and form a virtual RBridge, wherein TRILL management module 720 further includes a virtual RBridge configuration module 724. TRILL header processing module 722 generates the TRILL header and outer Ethernet header for ingress frames corresponding to the virtual RBridge. Virtual RBridge configuration module 724 manages the communication with RBridges associated with the virtual RBridge and handles various inter-switch communications, such as link and node failure notifications. Virtual RBridge configuration module 724 allows a user to configure and assign the identifier for the virtual RBridges.

In some embodiments, RBridge 700 may include a number of edge ports 702, as described in conjunction with FIG. 1. Edge ports 702 receive frames from (and transmit frames to) end devices. Ethernet frame processor 710 extracts and processes header information from the received frames.

In some embodiments, RBridge 700 may maintain a membership in a logical switch, wherein RBridge 700 also includes a virtual switch management module 740 and a logical switch 742, as described in conjunction with FIG. 1. Virtual switch management module 740 maintains a configuration database in storage 750 that maintains the configuration state of every switch within the logical switch. Virtual switch management module 740 maintains the state of logical switch 742, which is used to join other switches. In some embodiments, logical switch 742 can be configured to operate in conjunction with Ethernet frame processor 710 as a logical Ethernet switch.

Note that the above-mentioned modules can be implemented in hardware as well as in software. In one embodiment, these modules can be embodied in computer-executable instructions stored in a memory which is coupled to one or more processors in RBridge 700. When executed, these instructions cause the processor(s) to perform the aforementioned functions.

In summary, embodiments of the present invention provide a switch, a method and a system for constructing scalable forwarding tables that reduce the number of modifications to the entries in the tables during an update. In one embodiment, the switch includes a storage and a lookup mechanism. The storage stores a layer-2 forwarding table that contains an entry corresponding to a MAC address of a device and an identifier of a remote switch associated with the device. The storage also stores a route table that contains an entry indicating a local outgoing interface corresponding to the remote switch. The lookup mechanism identifies the local outgoing interface corresponding to the device based on the layer-2 forwarding table and the route table.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch for facilitating packet forwarding in a network of interconnected switches,
    wherein the network comprises at least the switch and an egress switch, and wherein the egress switch is a virtual switch associated with a number of physical switches; and
    wherein the switch comprises a storage device storing:
        a first data entry indicating a media access control (MAC) address of an end device and an identifier of the egress switch to which the end device is coupled;
        a second data entry which is separate from the first data entry and which indicates an outgoing interface corresponding to the egress switch; and
        a third data entry which maps an identifier of the virtual switch to one or more identifiers of the physical switches.

2. The switch of claim 1, wherein the first data entry is stored in a first data structure;
    wherein the second data entry is stored in a second data structure; and
    wherein the first data structure and the second data structure are separate from each other.

3. The switch of claim 1, wherein the first data includes a virtual local area network (VLAN) identifier associated with the end device.

4. The switch of claim 1, further comprising an update module adapted to update the identifier of the outgoing interface corresponding to the egress switch in the second data entry, while the first data entry remains unchanged.

5. The switch of claim 1, wherein the second entry includes a second outgoing interface corresponding to the egress switch.

6. The switch of claim 1, wherein the network is formed based on an Internet Protocol (IP), Multi-protocol Label Switching (MPLS), or (Transparent Interconnection of Lots of Links) TRILL protocol.

7. The switch of claim 1, further comprising a lookup module adapted to look up the first data entry to obtain the egress switch identifier based on the MAC address.

8. The switch of claim 1, further comprising a lookup module adapted to select one of the number of physical switches for forwarding a packet.

9. A method for facilitating packet forwarding in a network of interconnected switches,
    wherein the network comprises at least a switch and an egress switch, and wherein the egress switch is a virtual switch associated with a number of physical switches; and
    wherein the method comprises:
        storing in a storage device of the switch:
            a first data entry indicating a media access control (MAC) address of an end device and an identifier of the egress switch to which the end device is coupled;
            a second data entry which is separate from the first data entry and which indicates an outgoing interface corresponding to the egress switch; and
            a third data entry which maps an identifier of the virtual switch to one or more identifiers of the physical switches.

10. The method of claim 9, wherein the first data entry is stored in a first data structure;

wherein the second data entry is stored in a second data structure; and wherein the first data structure and the second data structure are separate from each other.

11. The method of claim 9, wherein the first data entry includes a virtual local area network (VLAN) identifier associated with the end device.

12. The method of claim 9, further comprising updating the identifier of the outgoing interface corresponding to the egress switch in the second data entry, while the first data entry remains unchanged.

13. The method of claim 9, wherein the second entry includes a second outgoing interface corresponding to the egress switch.

14. The method of claim 9, wherein the network is formed based on an Internet Protocol (IP), Muti-protocol Label Switching (MPLS), or (Transparent Interconnection of Lots of Links) TRILL protocol.

15. The method of claim 9, further comprising looking up the first data entry to obtain the egress switch identifier based on the MAC address.

16. The method of claim 9, further comprising selecting one of the number of physical switches for forwarding a packet.

17. A storage device storing instructions which when executed by a processor cause the processor to perform a method for facilitating packet forwarding in a network of interconnected switches, wherein the network comprises at least a switch and an egress switch, and wherein the egress switch is a virtual switch associated with a number of physical switches; and wherein the method comprises:

storing in a storage device of the switch:

a first data entry indicating a media access control (MAC) address of an end device and an identifier of the egress switch to which the end device is coupled;

a second data entry which is separate from the first data entry and which indicates an outgoing interface corresponding to the egress switch; and a third data entry which maps an identifier of the virtual switch to one or more identifiers of the physical switches.

18. The storage device of claim 17, wherein the first data entry is stored in a first data structure;

wherein the second data entry is stored in a second data structure; and wherein the first data structure and the second data structure are separate from each other.

19. The storage device of claim 17, wherein the first data entry in the first data structure further includes a virtual local area network (VLAN) identifier associated with the device.

20. The storage device of claim 17, wherein the method further comprises updating the identifier of the outgoing interface corresponding to the egress switch in the second data entry, while the first data entry remains unchanged.

21. The storage device of claim 17, wherein the second entry includes a second outgoing interface corresponding to the egress switch.

22. The storage device of claim 17, wherein the network is formed based on an Internet Protocol (IP), Muti-protocol Label Switching (MPLS), or (Transparent Interconnection of Lots of Links) TRILL protocol.

23. The storage device of claim 17, wherein the method further comprises looking up the first data entry to obtain the egress switch identifier based on the MAC address.

24. The storage device of claim 17, wherein the method further comprises selecting one of the number of physical switches for forwarding a packet.

* * * * *

UNITED STATES PATENT AND TRADEMARK OFFICE
CERTIFICATE OF CORRECTION

PATENT NO. : 9,112,817 B2  Page 1 of 1
APPLICATION NO. : 14/273414
DATED : August 18, 2015
INVENTOR(S) : Mythilikanth Raman et al.

It is certified that error appears in the above-identified patent and that said Letters Patent is hereby corrected as shown below:

In the Claims

In claim 14 (at column 13, line 16), please delete the word, "Muti-protocol" and replace with the word --multi-protocol--.

In claim 22 (at column 14, line 26), please delete the word, "Muti-protocol" and replace with the word --multi-protocol--.

Signed and Sealed this
Twenty-sixth Day of April, 2016

Michelle K. Lee
*Director of the United States Patent and Trademark Office*